(12) United States Patent
Loyd et al.

(10) Patent No.: US 7,389,157 B2
(45) Date of Patent: Jun. 17, 2008

(54) METHOD AND SYSTEM FOR INSPECTING A HOME FOR ENERGY EFFICIENCY

(75) Inventors: Cary Todd Loyd, White Settlement, TX (US); Joshua Andres Rodriguez, Fort Worth, TX (US); Andrew Robert Matthews, Fort Worth, TX (US); Stella Regina Storey, Azle, TX (US); Jeremy Lee Lord, Mansfield, TX (US); Nelson Rodriguez, Fort Worth, TX (US)

(73) Assignee: The Nelrod Company, Fort Worth, TX (US)

( * ) Notice: Subject to any disclaimer, the term of this patent is extended or adjusted under 35 U.S.C. 154(b) by 99 days.

(21) Appl. No.: 11/096,788

(22) Filed: Apr. 1, 2005

(65) Prior Publication Data
US 2006/0224358 A1    Oct. 5, 2006

(51) Int. Cl.
*G01M 1/38*   (2006.01)
*G06F 11/30*  (2006.01)

(52) U.S. Cl. .................................. 700/276; 702/182
(58) Field of Classification Search ............ 700/36, 700/276; 702/182, 62; 705/1, 26, 37, 412, 705/10, 38, 44
See application file for complete search history.

(56) References Cited

U.S. PATENT DOCUMENTS

2003/0040934 A1 *  2/2003  Skidmore et al. .............. 705/1
2005/0222889 A1 * 10/2005  Lai et al. ...................... 705/9

\* cited by examiner

*Primary Examiner*—Thomas K Pham
(74) *Attorney, Agent, or Firm*—Haynes and Boone, LLP

(57) ABSTRACT

A system is disclosed. The system includes a first information handling system ("IHS") for receiving, via a user input, data associated with an inspection of a home for energy efficiency, and outputting the data to a network. The system also includes a second IHS for receiving the data from the network, and in response to the data, generating a report.

8 Claims, 6 Drawing Sheets

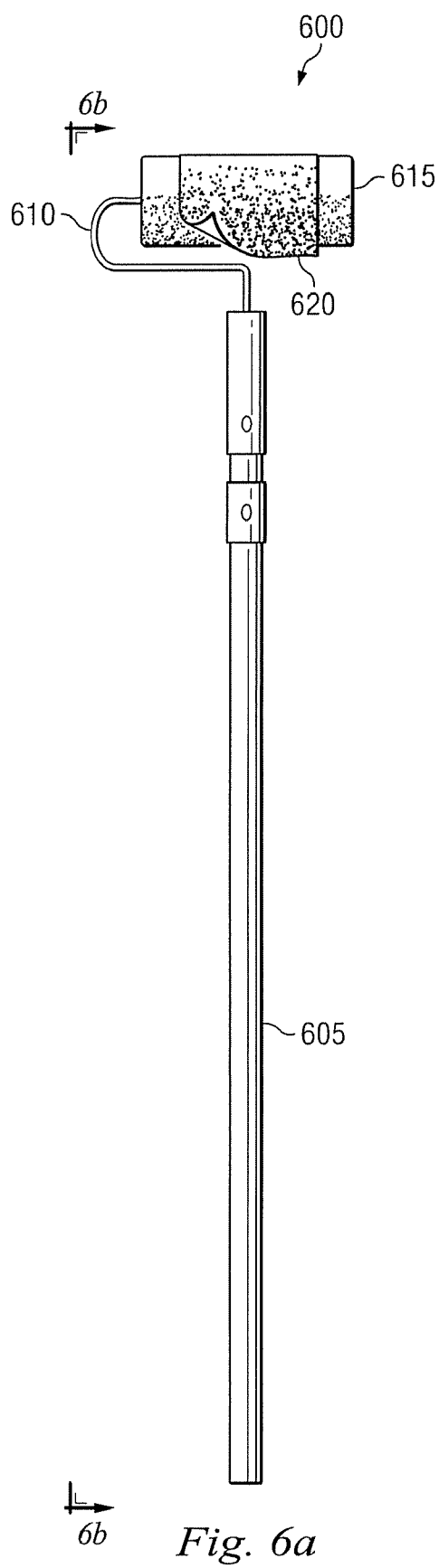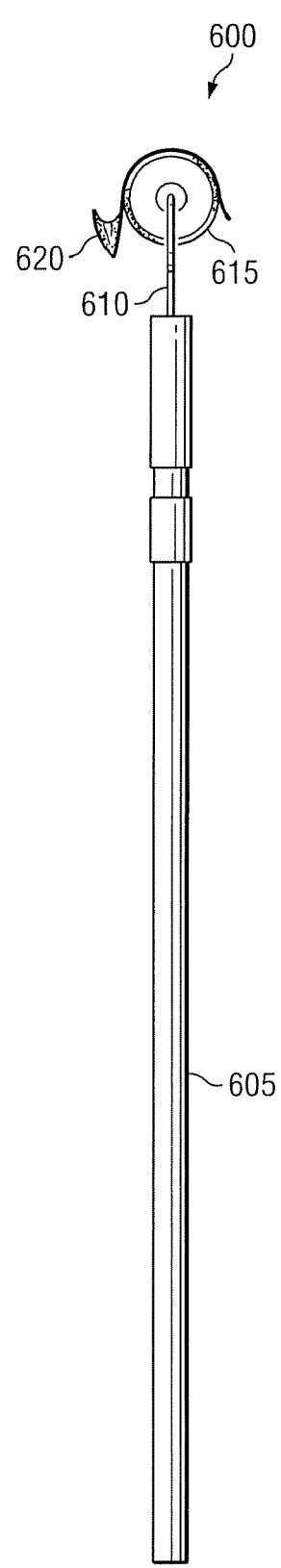
Fig. 6a
Fig. 6b

METHOD AND SYSTEM FOR INSPECTING A HOME FOR ENERGY EFFICIENCY

BACKGROUND

The description herein relates generally to home inspection and more particularly to a method and a system for inspecting a home for energy efficiency.

For buyers, builders, and sellers of a residential building (e.g., a home), and various government entities (e.g., the environment protection agency ("EPA")), energy efficiency of a home is important. For example, in many states, a newly built home must meet an energy efficiency standard required by a building code (e.g., the International Energy Conservation Code ("IECC")). Also, the EPA offers a program (i.e., the Energy Star Certification) in which, a home that is Energy Star certified, indicates that the home meets the standard for energy efficiency as required by the EPA. Such standard imposed by the EPA for Energy Star certification is typically more stringent than the standards required by the IECC and other building energy codes (e.g., the Model Energy Code of 1995).

For determining whether a home meets requirements of a building code or the Energy Star certification, a home inspection service provider performs various inspections and tests. With a conventional technique, such inspections and tests are less efficient.

What is needed is a method and a system for inspecting a home, without the disadvantage discussed above.

SUMMARY

Accordingly, a method and a system is disclosed. The system includes a first information handling system ("IHS") for receiving, via a user input, data associated with an inspection of a home for energy efficiency, and outputting the data to a network. The system also includes a second IHS for receiving the data from the network, and in response to the data, generating a report.

BRIEF DESCRIPTION OF THE DRAWINGS

FIG. 6a is a front view of a duct mask applicator, according to an illustrative embodiment.

FIG. 6b is a side view of the duct mask applicator of FIG. 6a.

DETAILED DESCRIPTION

Figure 1:
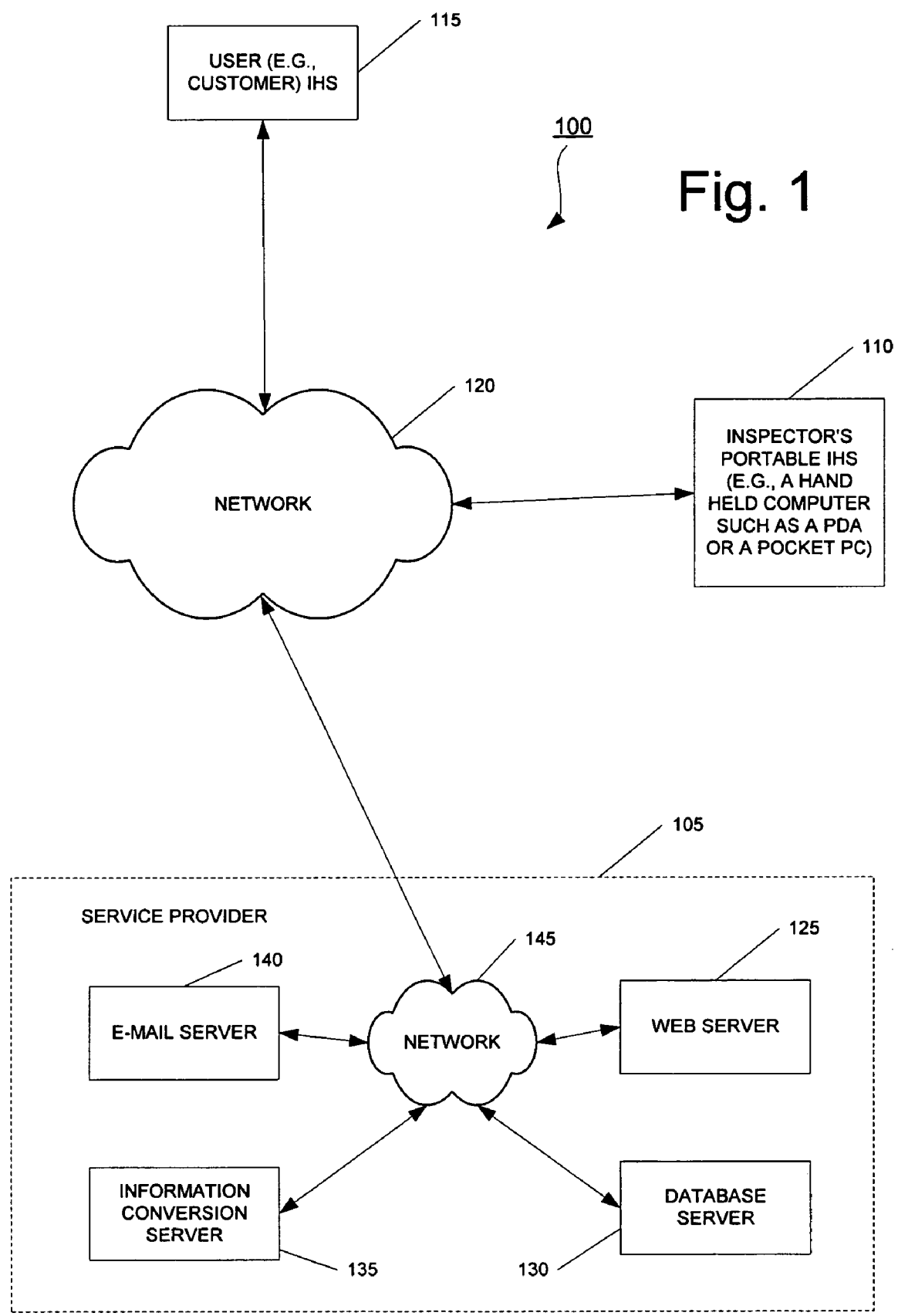
FIG. 1 is a block diagram of a system according to an illustrative embodiment.

FIG. 1 is a block diagram of a system, indicated generally at 100 according to the illustrative embodiment. The system 100 includes a home inspection service provider 105, an inspector's information handling system ("IHS") 110, and a user IHS 115. The system 100 also includes a network 120, such as a Transport Control Protocol/Internet Protocol ("TCP/IP") network. For example, the network 120 is the Internet.

The service provider 105 includes a web server 125, a database server 130, an information conversion server 135, and an electronic mail ("e-mail") server 140. The service provider 105 also includes a network 145 that is substantially similar to the network 120. In this example, the network 145 is an intranet. In another example, the network 145 is a part of the network 120.

Each of the IHS 110, the IHS 115, the web server 125, the database server 130, the information conversion server 135, and the e-mail server 140 includes a respective network interface for communicating with the networks 120 and 145 (e.g., by outputting information to, and receiving information from, the networks 120 and 145), such as by transferring information (e.g., instructions, data, signals) between such IHS (or server) and the networks 120 and 145. Accordingly, through the networks 120 and 145, each of the IHS 110, the IHS 115, the web server 125, the database server 130, the information conversion server 135, and the e-mail server 140 communicates with one another.

For clarity, FIG. 1 depicts only one inspector's IHS 110, although the system 100 may include additional inspector's IHSs which are substantially similar to one another. Likewise, for clarity, FIG. 1 depicts only one user IHS 115, although the system 100 may include additional user IHSs which are substantially similar to one another.

Each of the IHS 110 and 115 is for executing processes and performing operations (e.g., processing and communicating information) in response thereto, as discussed further below in connection with FIG. 3. Also, each of the web server 125, the database server 130, the information conversion server 135, and the e-mail server 140 is a respective IHS for executing processes and performing operations thereto, as discussed further below in connection with FIG. 3. Moreover, each such IHS is formed by various electronic circuitry components, and all such IHSs are coupled to one another. Accordingly, the IHS 110, the IHS 115, the web server 125, the database server 130, the information conversion server 135, and the e-mail server 140 operate within the network 120 and the network 145.

Figure 2:
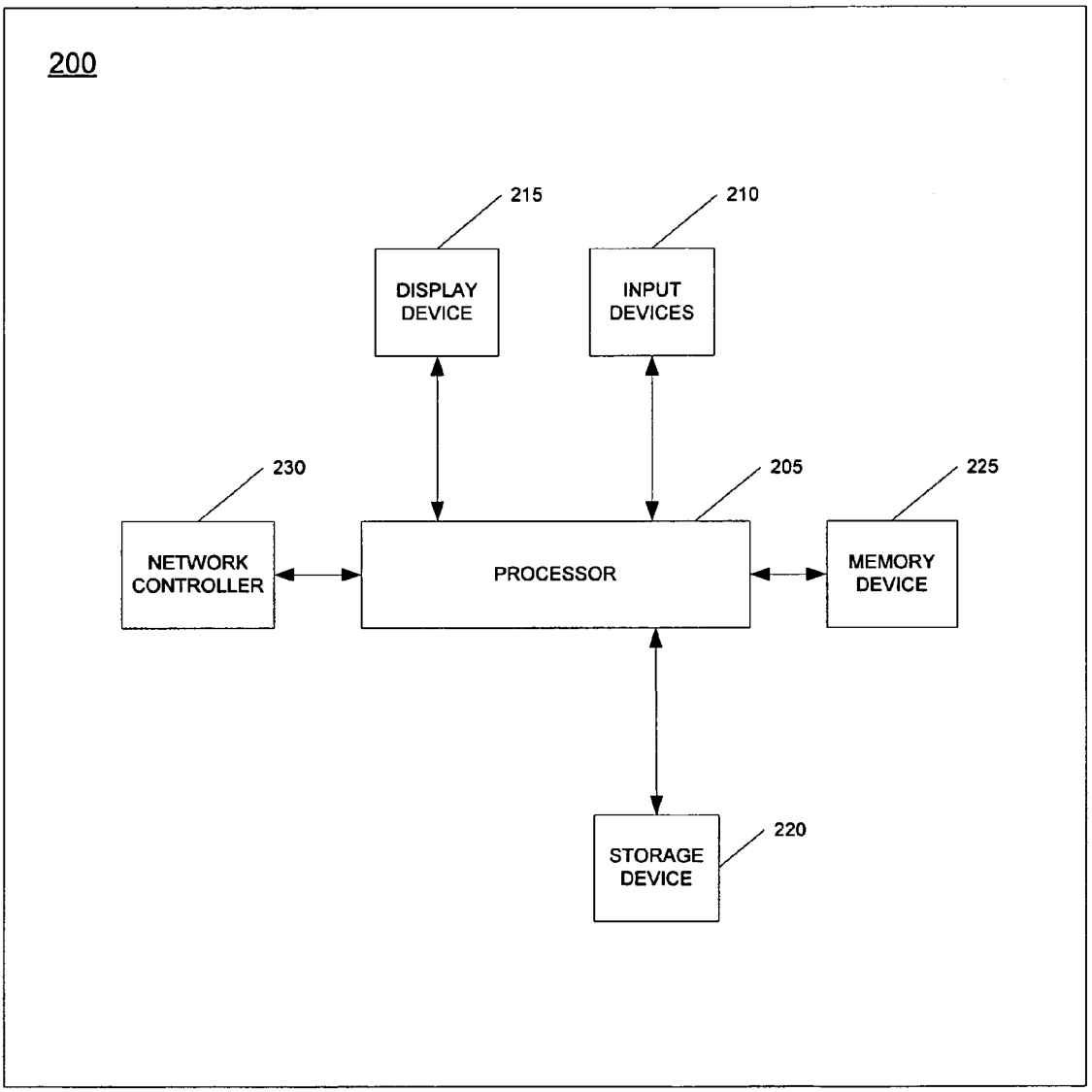
FIG. 2 is a block diagram of a representative information handling system ("IHS") of FIG. 1.

FIG. 2 is a block diagram of an IHS that is representative of the IHSs of FIG. 1. The IHS 200 includes a processor 205 (e.g., an Intel Pentium series processor) for executing and otherwise processing instructions, input devices 210 for receiving information from a human user, a display device 215 (e.g., a cathode ray tube ("CRT") device, a projector, a liquid crystal display ("LCD") device, or a plasma display device) for displaying information to the user, a storage device 220 (e.g., a non-volatile storage device such as a hard disk drive or other computer readable medium or apparatus) for storing information, a memory device 225 (e.g., random access memory ("RAM") device and read only memory ("ROM") device), also for storing information, and a network controller 230 for communicating between the IHS 200 and a network (e.g., one of the networks 120 or 145). Each of the input devices 210, the display device 215, the storage device 220, the memory device 225, and the network controller 230 is coupled to the processor 205, and to one another. In one example, the IHS 200 includes various other electronic circuitry for performing other operations of the IHS 200, such as a print device (e.g., a ink-jet printer or a laser printer) for printing visual images on paper.

The input devices 210 include, for example, a conventional keyboard and a pointing device (e.g., a "mouse", a roller ball, or a light pen). A user operates the keyboard to input alphanumeric text information to the processor 205, and the processor receives such information from the keyboard. A user also operates the pointing device to input cursor-control information to the processor 205, and the processor 205 receives such cursor-control information from the pointing device.

Referring again to FIG. 1, in the system 100, the service provider 105 performs various inspections and tests associated with home energy efficiency. Examples of such inspections and tests include inspections to determine whether home meets energy building code (e.g., the IECC), tests associated with home energy ratings, tests for air infiltration, and tests for leaks in a duct system.

In one example, the service provider 105 performs inspections and tests associated with EPA's Energy Star Certification. To be certified as Energy Star compliant, a home's air infiltration and duct system leakage must be within predetermined values specified by the EPA. Accordingly, an Energy Star Certified home provides various benefits to its owners. Such benefits include reduction in amount of dust and allergens (e.g., molds) within the home (and accordingly, a healthier environment), reduction in energy consumption, and reduction in maintenance costs for heating and cooling systems. Reduction in energy consumption also benefits the environment.

In association with performing the inspections and tests, the service provider 105 records data resulting from such inspections and tests. In the illustrative embodiment, the IHS 110 is a portable IHS (e.g., a handheld computer such as a personal digital assistant ("PDA") or a pocket persona computer ("PC")) capable of wirelessly (e.g., via one of the IEEE 802.11 protocols) being coupled to the network 120. Accordingly, an inspector (i.e., an inspector employed by or associated with the service provider 105) initially inputs (i.e., enters) such data into the portable IHS before, during or after performing the inspections and tests, at the home being inspected. The IHS 110 is operable (e.g., by the inspector) to output such data to one or more IHSs of the service provider 105 (e.g., the database server 130). Also, the portable the IHS 110 is operable to receive various information (e.g., a list of homes to be inspected) from one or more IHSs of the service provider 105.

After an inspector has entered data associated with an inspection into the IHS 110, the IHS 110 is operable to form a report in response to such data. The IHS 110 is also operable to output such report to a print device (e.g., a print device located in the inspector's vehicle).

As discussed above, the IHS 110 is capable of being coupled wirelessly to the network 120. In one example, after the inspector has entered data associated with an inspection, the inspector takes the IHS 110 to a "hotspot" or any other location offering wireless connectivity so that the inspector is able to transfer the data stored in the IHS 110 to one or more of the IHSs included by the service provider 105.

In one example, the information conversion server 135 receives data associated with an inspection from the IHS 110. In response to receiving such data, the information conversion server 135 converts the data into a format suitable for storage by the database server 130. The server 135 outputs such converted data to the database server 130 so that the database server 130 stores the data. The database server 130 outputs such data to the web server 125. The web server 125 is capable of outputting (e.g., via the hyper text transfer protocol ("HTTP")) the data and/or analyses of such data (e.g., included in a report) to the user IHS 115. In this way, the data and/or the analyses (e.g., included in a status report) are viewable by users of the IHS 115. Users of the IHS 115 include builders, home owners, municipalities, utility companies, associated raters/inspectors and other clients of the service provider 105.

In another example, the IHS 110 is operable to output data associated with an inspection in an e-mail attachment. The e-mail server 140 is capable of receiving such data included in the attachment, and outputting such data to the web server 125. The data and/or analyses of such data (e.g., included in a report) are viewable by users of the IHS 115 in the manner discussed above.

In one example data associated with an inspection includes the following information: contact/builder, date of the inspection, time of inspector's arrival and departure, address of the home inspected, subdivision of the home inspected, the home's model or plan, batch number (if applicable), inspector's identification information, number of stories, inspection type, insulation information, information about windows, water heater information, air conditioning ("A/C") system information, duct blower testing results, blower door testing results, visual inspection information, and batched final information. The inspection type includes information indicating whether the inspection is a first insulation inspection, a first re-inspection, a second re-inspection, or a final inspection. The insulation information includes information about wall, slopes, and hidden hot walls if the inspection is a pre-wallboard inspection and "blown-in insulation" if the inspection is a final inspection. Information about windows includes, for a pre-wallboard inspection, solar heat gain coefficient ("SHGC"), window areas and "U" factor for windows. Water heater information includes, for a final inspection, brand name, model number, capacity, and fuel type. In one example, the water heater information also includes information indicating whether heat traps are present and whether pipes are correctly insulated. For a condenser unit, A/C system information includes brand name, model number, serial number, and seasonal energy efficiency ratio ("SEER") value. For A/C evaporative coil, the A/C information includes model and serial numbers. Batched final information includes information indicating that, if the home being inspected is a part of a subdivision in which a predetermined number (e.g., three) of homes have passed final inspections and the home is not a sample home, the home is subject to a visual final inspection. For such batched final home, the inspector does not perform duct and blower tests (i.e., only performs visual inspections).

Figure 3:
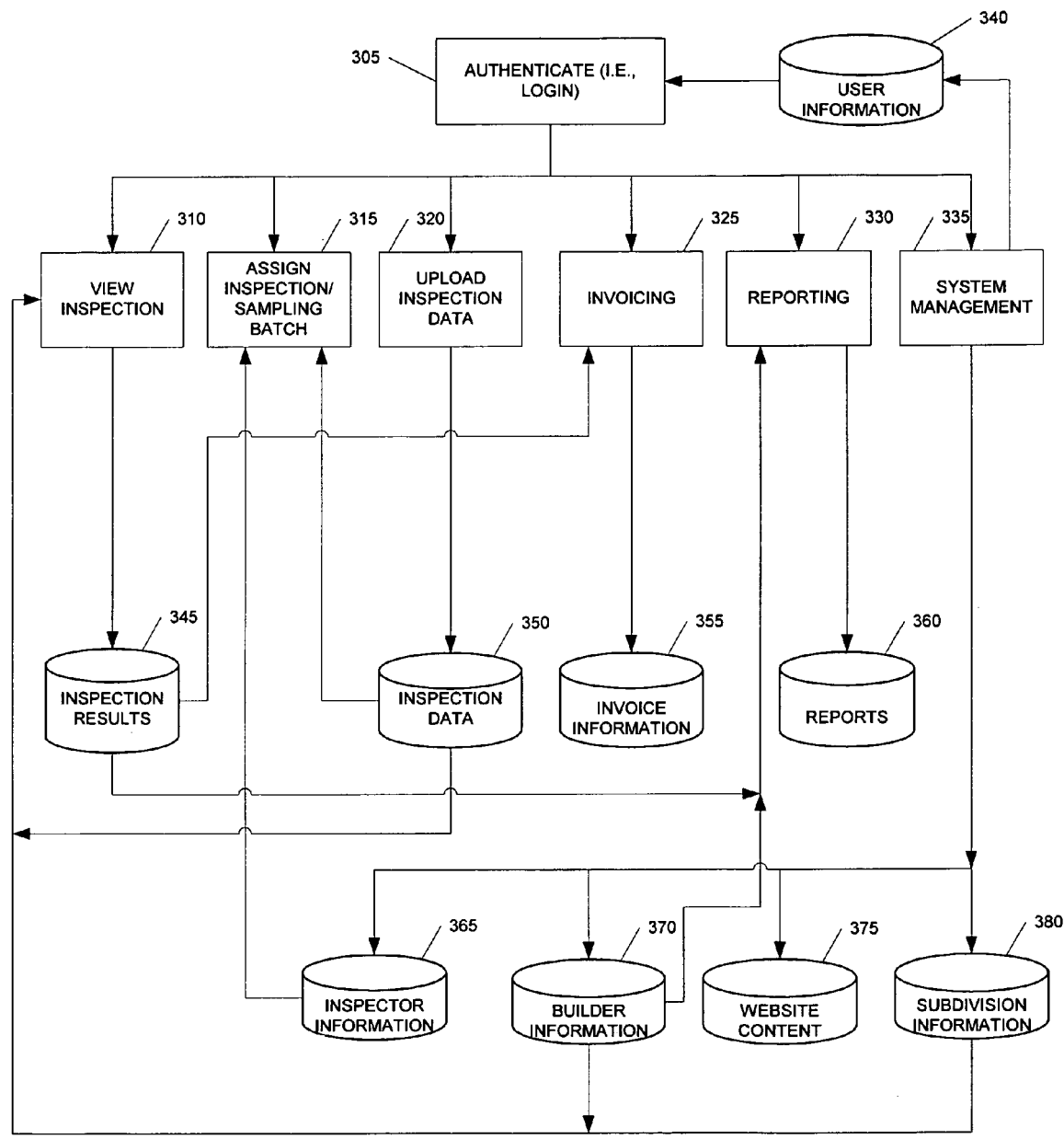
FIG. 3 is a conceptual illustration of various processes executed by one or more IHSs of a service provider of FIG. 1.

Accordingly, FIG. 3 is a conceptual illustration of various processes executed by at least one of the IHSs of the service provider 105 for performing operations associated with inspecting a home for energy efficiency. As shown in FIG. 3, the IHS executes an authentication process 305, a view inspection process 310, an assign inspection/sampling batch process 315, an upload inspection data process 320, an invoicing process 325, a reporting process 330, and a system management process 335.

The authentication process 305 performs operations to authenticate (e.g., "log-in") a user so that the user is able to operate the IHS to execute the various processes illustrated in FIG. 3. The process 305 performs its operations in response to user information 340. In one example, in response to receiving user identification information (e.g., a user name and/or password) from a user, the authentication process determines whether such user identification information is valid by consulting the user information 340. Such user identification information is receivable via a network (e.g., the network 120).

The view inspection process 310 performs operations to output inspection results 345. More particularly, in response to a user command, the process 310 is capable of searching by property characteristics and/or adding new inspection characteristics. For example, the process 310 searches inspection data 350 and forms the inspection results 345 in response to data stored therein. The inspection results 345, output by the process 310, are viewable by a user (e.g., a user of the IHS 115). The process 310 also performs its operations in response to builder information 370 and subdivision information 380.

The assign inspections/sampling batch process 315 performs operations to assign inspections to respective inspectors. The process 315 performs its operations in response to the inspection data 350 and inspection information 365.

The upload inspection data process 320 performs operations to input and output information such as a list of properties to be inspected, to an inspector's portable IHS (e.g., the IHS 110). Also, the process 320 performs operations to receive data associated with one or more inspections from such IHS. In one example, the process 320 receives such data in a file and searches the file. The process 320 corrects the data as needed so that the data is suitable for viewing by a user (e.g., via the view inspection process 310).

The invoicing process 325 performs operations to generate invoice information for billing clients (e.g., a builder, associate rater) for inspection and testing services performed by the service provider 105. The process 325 performs such operations in response to the inspection results 345.

The reporting process 330 performs operations to generate various reports 360 associated with one or more inspections. Accordingly, the process 330 performs its operations in response to the inspection results 345. Also, the process 330 performs its operations in association with the builder information 370. Examples of the reports 360 generated by the process 330 includes sampling protocol reports, daily reports, yearly reports, client/builder reports, local compliance reports, and otherwise customized reports.

The system management process 335 performs operations for managing (e.g., adding to and/or modifying) various information associated with the processes depicted in FIG. 3. For example, the process 335 manages the user information 34, the inspector information 365, the builder information 370, website content 375, and the subdivision information 380.

In more detail, by executing the various processes of FIG. 3, the IHS is capable of performing the operations discussed below to inform users about one or more inspections. For example, in response to a user (e.g., a client of the service provider such as a builder) request, that includes information (e.g., address and/or description) about a home, the IHS outputs a report including legal description and specific address of targeted homes for obtaining documents such as building permits from a local jurisdiction, Energy Star certificates, labels, mortgage reports, and disclosure forms. Also, the IHS is capable of outputting notifications to a user indicating a project's schedule. In one example such notification includes an indication that a project is behind schedule. Such notifications are included in reports (e.g., the reports 360), e-mail messages, and or "pop-up" screens, which are viewable by the user in "real-time".

The IHS analyzes data associated with an inspection. For example, if the inspection is for determining whether a home complies with an energy building code, the IHS analyzes the data to make such determination. In such situation, the reports 360 generated by the process 330 includes an indication of whether the home complies with the energy building code. In another example, if the inspection is for determining whether the home is certifiable as an Energy Star certified home, the IHS analyzes the data to make such determination. In such situation, the reports 360 generated by the process 330 includes an indication of whether the home is certifiable as an Energy Star certified home.

As discussed above, the service provider 105 (i.e., an inspector of the service provider 105) performs inspections and tests of a home for energy efficiency, and records data resulting from such inspections and tests (e.g., on a handheld computer). The service provider 105 performs inspections and tests as discussed below in more detail FIG. 4.

Figure 4:
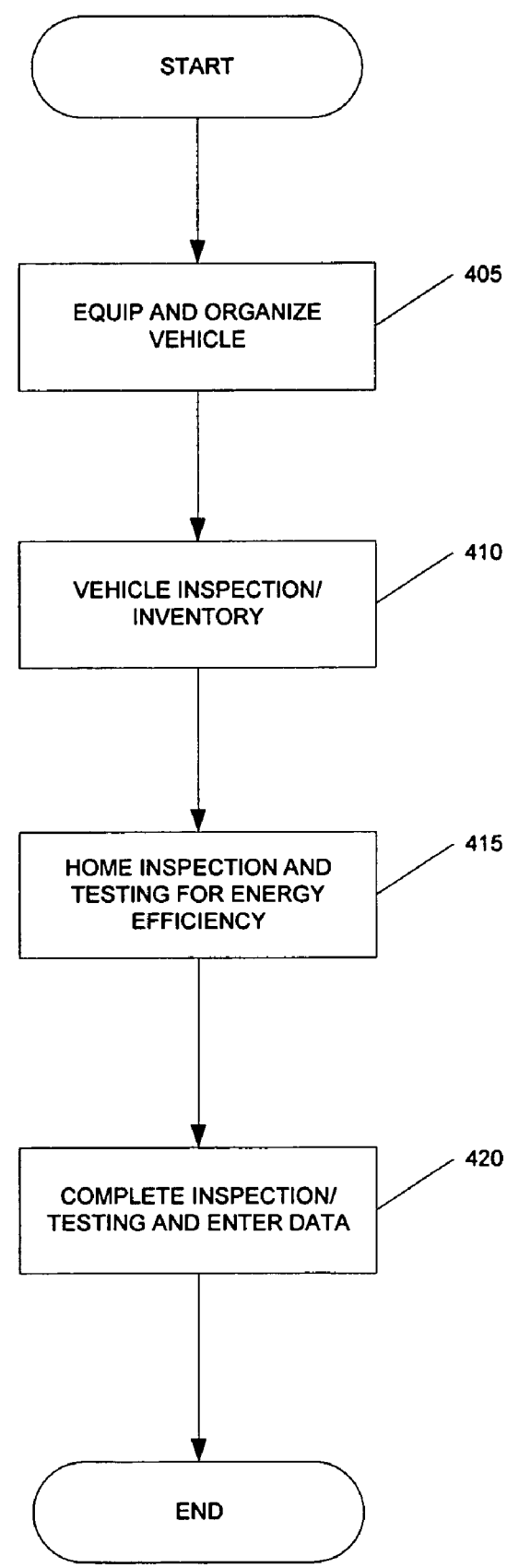
FIG. 4 is a flow chart of operations performed by the service provider of FIG. 1.

Accordingly, FIG. 4 is a flow chart of operations performed by the service provider 105 for inspecting a home for energy efficiency. For clarity, FIG. 4 depicts steps of the operations in a serial manner. However, such depiction does not imply sequential limitations.

The operations begin at a step 405, where the service provider 105 equips a vehicle (e.g., a van or a truck) with various tools and devices for inspecting a home. The service provider 105 also organizes such tools and devices so that they are more easily accessible by an inspector. The tools and devices include a portable IHS (e.g., the IHS 110), a portable print device, a digital camera (for capturing images during an inspection), a duct sealant tape applicator (discussed in more detail below in connection with FIG. 6), smoke generation device, a blower door, a duct blower, a ladder, drills and other equipments and tools. After the step 405, the operations continue to a step 410.

At the step 410, the service provider 105 inspects the vehicle for flat tires, broken belts, and other inoperative equipment. The service provider 105 also takes inventory of the vehicle to ensure that supplies, tools and devices needed for inspecting and testing a home are available. Such inspection and taking of inventory are performed at the beginning of a work day. After the step 410, the operations continue to a step 415.

At the step 415, the service provider 105 performs inspections of a home. Examples of types of inspections and tests include insulation inspection (pre-wallboard sampling program), duct blower performance testing at pre-wallboard inspection, final compliance inspection and quality assurance review, blower door/duct system testing at final, blower door full house pressurization test, and duct system pressurization test at final. The service provider 105 (i.e., an inspector of the service provider 105) performs such inspections and tests according to a detailed protocol as discussed below.

For insulation inspection (pre-wallboard sampling program), an inspector checks for the following: insulation not installed or installed incorrectly, floor plates not sealed with caulk or foam, fireplaces not sealed to the outside, wiring and plumbing penetrations not sealed, ceiling/floor joist cavities to be blocked to outside walls or attics, corners that are not taped or foamed, windows that are not foamed, caulked, or properly sealed, exterior or attic doors that are not sealed between the framing and the jamb, chases in which ducts run from floor to floor which are either not insulated or air-sealed at the attic level around the ducts, knee walls that are not insulated, mechanical decking without insulation under it, wire and pipe penetrations to the outside of the house envelope that are not sealed, and other areas where air sealing penetrations are evident.

The inspector walks the outside of the home, checking the sheathing for holes, tears, seams not fitted tightly, and protrusions that are not foamed. Also, the inspector visually inspects the duct system, looking for mastic at seams, joints, connections, and splices. Moreover, the inspector checks cold-air returns to verify they are completed and not relying solely on gypsum board/framing for seal. Furthermore, the inspector verifies that ducts have the correct insulation R-value (e.g. 12 SEER R-6 on all/10 SEER R-8 on Supply, R-6 on Return).

The duct blower performance testing during pre-wallboard inspection typically requires two persons (e.g., an inspector and an assistant). For clarity, the following discussion references the inspector as the person performing the operations. However, the inspector and/or the assistant are both capable of performing the operations discussed below. In performing the test, the inspector uses a duct blower, a duct mask (e.g., sealant tape) applicator, a ladder, duct mask, a handheld computer (e.g., the IHS 110), and other items such as power cords.

The inspector verifies that all ducts are properly connected and sealed with mastic prior to connecting the duct blower to the duct system. First of the two persons tapes duct register boxes. The first person begins in the room to the right of front door, and tapes all registers with duct mask or another type of adhesive sealant using the duct mask applicator. The second person configures the duct blower by first removing air filters and verifying that the blower's fan cover is on air handler to be tested. The second person also ensures that make-up air damper is closed, and attaches the duct blower hose flange to the cold-air return, ensuring that there are no leaks proximate attachment points. Moreover, the second person connects the duct blower to the flange using a Velcro strap.

The second person continues to prepare for the test by connecting an input hose and a reference hose to a manometer, a bras nipple, and a plastic nipple of the duct blower fan. The second person also inserts a metal end of the input hose into a register connected closest to the unit being tested, and connects the other end to the input connector of the manometer.

The inspector is capable of conducting the test from the cold-air return or by removing the air handler blower fan cover and attaching the duct blower flange in place of the door. In either case, the cold-air return is included in the test. The inspector activates the equipment, and in response thereto, the duct blower pressurizes the duct system. The inspector records readings from the test in cubic feet per minute ("cfm"). The inspector records any unacceptable air leakage, and identifies the area by spraying colored paint on the area that is defective. If the inspector determines that the duct system performance test has failed, the inspector informs the client, and schedules a re-test with the client after construction defects are corrected. In response to determining that the home has passed the test, the inspector and assistant return all equipment to the correct bags and carry them to the van, where they are stored in the designated area for each piece of equipment.

An inspector performs the final compliance inspection after construction of a home is completed and all equipment is installed. For the final compliance inspection, the inspector verifies that the home's attic has proper levels of blown-in insulation by reading appropriate markers or measuring with a ruled instrument, and by ensuring that the insulation is at a correct designated level. In doing so, the inspector consults a building code insulation letter or an Energy Star report. The inspector also performs the additional operations discussed below.

For example, the inspector ensures that air-conditioning air handler fan covers are secured tightly, mastic is applied metal to metal on all seams, and that the ducts are not loose.

The inspector also determines whether there are any holes in the gypsum board (or wallboard), missing door hardware or weather-stripping, broken or missing windows, or any other defects capable of preventing the home from passing a pressurization test (e.g., a blower door test). Moreover, the inspector determines whether condensers are rated at a proper SEER value or above, and records information about them (e.g., the "A" (evaporative) coil model and serial numbers). For a structure that is electric, the inspector verifies that a heat pump is installed. Furthermore, the inspector checks heat traps and pipe insulation on the water heater piping, and records its model number, an indication of whether it is gas or electric, and its capacity.

Similar to the duct blower performance testing at pre-wallboard inspection, blower door/duct system quality assurance testing at "final" requires two persons (e.g., an inspector and an assistant). Before entering the home to perform the inspection, the inspector records information about air-conditioning condenser and verifies that it is rated at the proper SEER value. The inspector also records the "A" (evaporative) coil numbers from the air handler.

Before configuring the equipment, the inspector and/or the assistant visually check the home for loose ducts, missing or open ducts, doors, windows, tub skirts, attic access hole covers, and wet paint on door jambs. While a first of the two persons configures the blower door, a second person configures the duct blower. After the equipment is properly configured, both persons further prepare the home for testing as discussed below.

For clarity, the following discussion references the inspector as the person performing the operations. However, the inspector and/or the assistant are both capable of performing the operations. The inspector deactivates the thermostat to ensure that the air handler does not activate while the test is performed. In all rooms, the inspector seals (e.g., using sealant tape or duct mask) all duct registers, and ensures that all windows are closed and locked. The inspector also inspects doors (e.g., closet doors, bedroom doors, and other doors) for holes or other penetrations leading to outside of the home. Moreover, the inspector inspects weather seals and closes and locks doors leading to outside.

The inspector performs the following additional preparatory operations. The inspector checks mechanical closet doors for weather seals, and ensures that such doors are closed. While in the mechanical closet, the inspectors places keys on top of the hot water heater (as a reminder to be removed later), and sets the temperature control knob to "warm". This reduces a likelihood of a "flame roll-out". Also, the inspector closes all fireplace dampers and doors.

For performing the blower door full house pressurization test, the inspector performs the following preparatory operations. The inspector positions the door assembly in the door and locks all cams, takes a reference hose and throws it out an opening and to the side of the door (e.g., approximately 5 feet out of the way of airflow from the fan), slides the fan through the opening with the wire cover out the door, and connects the input hose to a brass nipple on the fan shroud. The inspector also positions the manometer holder assembly on the door or another solid surface, attaches the manometer, and connects the reference hose to the bottom left hose bib and the input hose to the top right hose bib of the manometer. Moreover, the inspector selects appropriate fan and ring settings, and turns the knob selector to the "pressure" setting, while setting the channel selector to channel "A".

If performing the test using a manometer with manual knob controls, the inspector takes a baseline pressure reading with the cover on the blower door fan, records an indication of whether it was positive or negative, also records the Pascal ("Pa") reading, and removes the cover and ring 2. Also, the inspector slowly turns the knob on the blower fan controller until 50 Pa of negative pressure is reached. In doing so, if such pressure is not reachable, the inspector removes ring 1 and sets the fan selection again to 0 rings. If such pressure is still not reachable, the inspector increases or decreases the fan to the next even number below 50 (e.g., 45/40/35), switches to "flow" and channel "B," and records the measurement. Moreover, using the "can't reach fifty" chart on the fan speed controller, the inspector determines the conversion factor for the pressure that was reached (e.g., 45/40/35), and multiplies the cfm value read by the factor. If the manometer begins to blink when taking the flow reading, the inspector adds a ring, resets the fan selector to ring 2, performs the test again, and records the reading.

If performing the test using a manometer with touch pad controls, the inspector activates the manometer, places the manometer into "pressure/flow@50 mode". With all flow rings on the fan, the inspector presses the baseline button causing "baseline" to flash on the screen. The inspector presses the start button, and allows the manometer to operate for approximately 5 seconds to approximately 10 seconds (e.g., by reading the time on a right portion of the manometer screen). The inspector also presses the "enter" button in response to an appropriate reading, removes the cover, chooses the desired ring combination, presses the device button to switch to the proper blower door fan type (e.g., "BD 3"), and presses the "configuration" button to select the desired flow ring combination (e.g., open, A1, A2). Moreover, the inspector presses the unit button to ensure that proper airflow units are selected (e.g., cfm), activates the fan, adjusts so that the fan pressure is between approximately −45 Pa and approximately −55 Pa, records cfm reading from a right portion of the manometer screen, and records the data displayed. If "LO" appears on the right portion of the screen, it is an indication that the fan pressure has dropped below approximately 10 Pa, and that an additional ring needs to be installed. In response, the inspector modifies the test device configuration to an appropriate configuration as discussed above (e.g., by pressing the configuration button to select a desired flow ring combination).

For performing the duct system pressurization test at final, the inspector performs the following operations. In one example, for performing the test using a manometer with touch pad controls, the inspector removes filters from the unit, attaches the duct blower hose flange to the cold-air return, and ensures that there are no leaks around attachment points. The inspector also connects the duct blower to the flange using a Velcro strap. The inspector starts with ring 3, and activates the fan with the wire fan cover positioned out. The inspectors positions the airflow straightening device (e.g., a honeycomb-shaped piece of foam) in place while depressurizing the ducts. The inspector connects the input hose (top right hose bib) and the reference hose (bottom right hose bib) to the manometer and to the brass hose bib (input) and plastic hose bib (reference) on the duct blower fan. The inspector Inserts the metal end of the clear input hose into a register connected closest to the unit being tested, and connects the other end to the manometer hose bib (top left). The inspector adjusts the blower door fan speed to approximately −25 Pa of pressure, activates the manometer, and presses the "mode" button once to put gauge into a pressure flow ("PR/FL") mode. The inspector also selects the proper flow ring configuration (A1, B2, C3), installs the flow ring, presses the "device" button, and selects the device type (e.g., DB B). Moreover, the inspector presses the "configuration" button, selects the proper ring configuration (e.g., open, A1, B2, C3), activates the duct blower fan, and adjusts the speed until zero (0) is displayed on the left portion of the manometer display screen. Furthermore, the inspector determines whether the blower door fan speed is still at −25 Pa, adjusts if necessary, determines whether the duct blower pressure is still zero, and if necessary, adjusts the fan speed to zero. Finally, the inspector records cfm reading on the right portion of the manometer display screen.

For performing the test using manometer with manual knob controls, the inspector removes the filters from the unit, attaches the duct blower hose flange to the cold-air return, and ensures that there are no leaks around attachment points. The inspector also connects the duct blower to the flange using a Velcro strap. Starting with ring 3, the inspector activates the fan with the wire fan cover out. The inspector positions the airflow straightening device (e.g., a honeycomb-shaped piece of foam) in place when depressurizing the ducts. The inspector connects the input hose (top right hose bib) and reference hose (bottom right hose bib) to the manometer and to the brass hose bib (input) and plastic hose bib (reference) on the duct blower fan, inserts the metal end of the clear input hose into a register connected closest to the unit being tested, and connects the other end to the manometer hose bib (top left). The inspector includes the cold-air return in the test. The inspector also adjusts the blower door fan speed to approximately −25 Pa, with the selector knob turned to the fan position, and selects "8/ring 3", sets the selector switch to "pressure" and the channel selector to "A." If the duct blower manometer does not indicate 0, the inspector slowly activates the duct blower fan controller until it indicates 0. Moreover, the inspector sets the channel selector knob to channel "B," and records the resulting measurement. For each additional A/C unit, the inspector performs substantially identical operations discussed above.

Referring again to FIG. 4, after the step 415, the operations continue to a step 420. At the step 420, the inspector completes the inspection and transfers data (stored in a handheld computer) to one or more IHSs of the service provider 105 as discussed above in connection with FIGS. 1 and 3.

In performing the inspections discussed above, the inspector utilizes various devices. For example, in performing air infiltration tests, the inspector utilizes a blower door. For transporting a blower door in a vehicle, the inspector stores the blower door in a blower door rack.

Figure 5A:
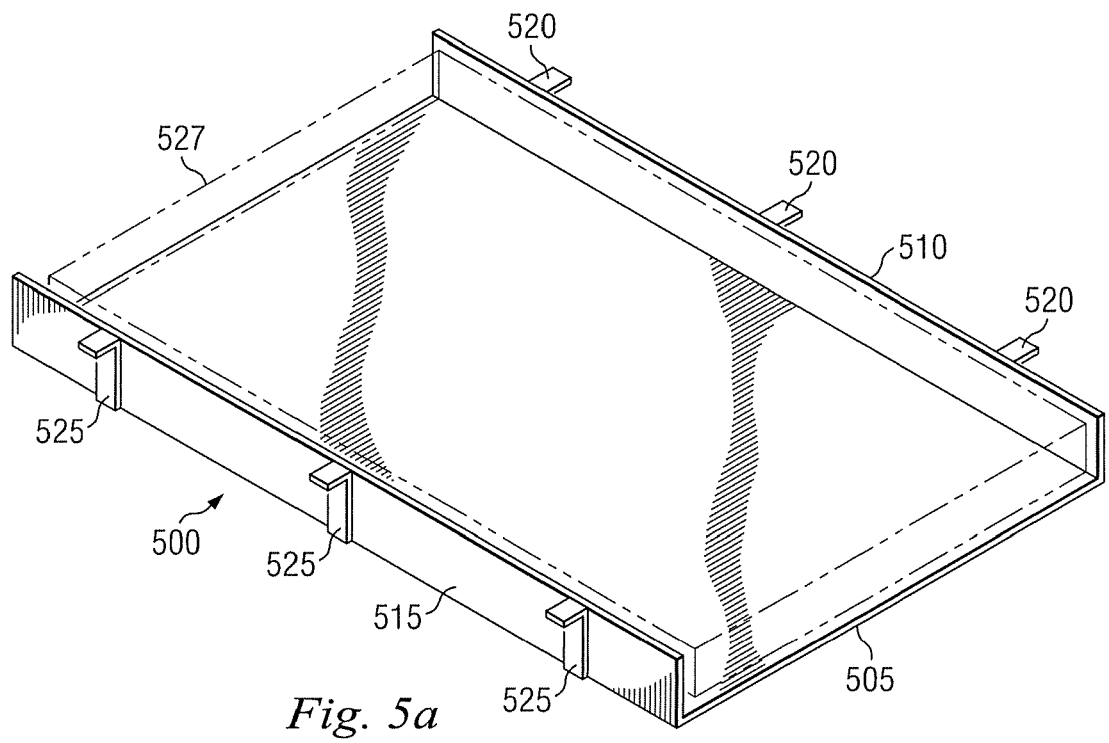
FIG. 5a is a perspective view of a blower door support apparatus, according to an illustrative embodiment.
Figure 5B:
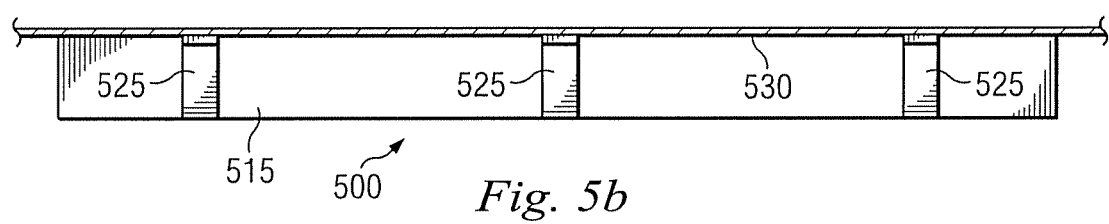
FIG. 5b is a side view of the blower door support apparatus of FIG. 5a mounted to a surface of a vehicle.

Accordingly, FIG. 5*a* is a perspective view of a blower door support apparatus (e.g., a rack), indicated generally at 500, according to an illustrative embodiment. FIG. 5*b* is a side view of the apparatus 500 mounted to a surface 530 of a vehicle. The following discussion simultaneously references FIGS. 5*a* and 5*b*. The apparatus 500 includes a bottom surface 505, a first side 510, a second side 515 opposite the first side 510, a first plurality of mounting brackets 520, and a second plurality of mounting brackets 525.

Via the mounting brackets 520 and the mounting brackets 525, the apparatus 500 is mountable (e.g., with screws) to the surface 530 of a vehicle. For example, the apparatus 500 is mountable to a ceiling of a van or a ceiling of a truck bed cover. After mounted as such, the bottom surface 505 supports a blower door 527. The apparatus 500 is operable for storing a fully extended blower door or a blower door that is partially collapsed.

Each of the first side 510 and the second side 520 forms a substantially 90 degree angle with the bottom 505. Also, each of the first side 510 and the second side 520 has a width that is at least substantially equal to the width of a blower door for which the apparatus is designed to hold. In one example, each of the sides 510 and 520 has a width from about (i.e., approximately) 3 inches to about 7 inches.

Length of the apparatus 500 is at least substantially equal to the length of the blower door for which the apparatus 500 is designed to hold. In one example, the length of the apparatus (e.g., length of the bottom surface 505) is from about 5 feet to about 7 feet. Also, width of the apparatus 500 is at least substantially equal to the width of the blower door for which the apparatus 500 is designed to hold. In one example, such width of the apparatus 500 is from about 3 feet to about 4.5 feet.

In association with performing tests to determine duct system leakage, the inspector temporarily seals duct registers with adhesive material such as duct mask. The inspector uses a duct adhesive sealant applicator to seal (e.g., by applying duct adhesive sealant to) duct registers.

Accordingly, FIG. 6a is a front view of a duct adhesive sealant (e.g., duct mask) applicator, indicated generally at 600, according to an illustrative embodiment. FIG. 6b is a side view of the applicator 600 of FIG. 6a. The following discussion simultaneously references FIGS. 6a and 6b.

The applicator 600 includes an extendable handle 605. The handles 605 is rigidly attached to a first end of a rod member 610. A roller 615 is rotatably coupled to a second end of the rod member 610. The applicator 600 is usable (e.g., by an inspector and/or assistant) to apply a piece of duct adhesive sealant 620 to a duct register.

The handles 605 has a variable length such that, applicator 600 is usable to apply the piece 620 to a duct register without using a ladder. Accordingly, in one example, the length of the handle 605 is variable from about 5 feet to about 21 feet. The handle 605 is constructed from fiberglass, metal, and or any other material having similar rigidity.

The roller 615 has a width of about 5 inches to 12 inches. The roller 615's surface is constructed from fiberglass, rubber, hard sponge, and/or any other material such that roller 615 is usable to apply downward pressure (e.g., by firmly rolling the roller 615 over the piece of duct mask 620) sufficient to apply the piece of duct adhesive sealant 620 to a duct register.

The piece 620 is a previously cut rectangular piece, and its size is sufficient to cover a duct register to be temporarily sealed. At least one side of the piece of duct adhesive sealant 620 is adhesive.

In the illustrative embodiment, the applicator 600 is usable to apply the piece of duct adhesive sealant 620 to a duct register. However, in another embodiment, the applicator is usable to apply adhesive sealant from a roll of perforated adhesive sealant.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. A system comprising:
   a first information handling system ("IHS") for receiving, via a user input, data associated with an inspection of a home for energy efficiency, and outputting the data to a network; and
   a second IHS for receiving the data from the network, and in response to the data, generating a report;
   wherein at least one of the first IHS and the second IHS analyzes the data and, based on results of the analysis, determines whether the home meets a predefined standard of energy efficiency;
   wherein the standard is compliant with requirements for certification as an Energy Star certified home, and the report includes an indication of whether the home is certifiable as an Energy Star certified home.

2. The system of claim 1, wherein the inspection includes:
   determining the home's level of air infiltration.

3. The system of claim 2, wherein determining the home's level of air infiltration includes testing with a blower door.

4. The system of claim 1, wherein the inspection includes:
   testing the home's duct system for leakage.

5. A method comprising:
   providing a first information handling system ("IHS") for receiving, via a user input, data associated with an inspection of a home for energy efficiency, and outputting the data to a network; and
   providing a second IHS for receiving the data from the network, and in response to the data, generating a report;
   wherein at least one of the first IHS and the second IHS analyzes the data and, based on results of the analysis, determines whether the home meets a predefined standard of energy efficiency;
   wherein the standard is compliant with requirements for certification as an Energy Star certified home, and the report includes an indication of whether the home is certifiable as an Energy Star certified home.

6. The method of claim 5, wherein the inspection includes:
   determining the home's level of air infiltration.

7. The method of claim 6, wherein determining the home's level of air infiltration includes testing with a blower door.

8. The method of claim 5, wherein the inspection includes:
   testing the home's duct system for leakage.

* * * * *